United States Patent
Miyahara

(10) Patent No.: US 9,118,860 B2
(45) Date of Patent: Aug. 25, 2015

(54) IMAGE FORMING APPARATUS CAPABLE OF DRAWING STAMP ON RECORDING SHEETS, AND IMAGE FORMING METHOD

(71) Applicant: KYOCERA Document Solutions Inc., Osaka-shi, Osaka (JP)

(72) Inventor: Norifumi Miyahara, Osaka (JP)

(73) Assignee: KYOCERA Document Solutions Inc., Osaka-shi (JP)

(*) Notice: Subject to any disclaimer, the term of this patent is extended or adjusted under 35 U.S.C. 154(b) by 0 days.

(21) Appl. No.: 14/462,443

(22) Filed: Aug. 18, 2014

(65) Prior Publication Data

US 2015/0062650 A1    Mar. 5, 2015

(30) Foreign Application Priority Data

Aug. 30, 2013 (JP) ................................. 2013-179377

(51) Int. Cl.
*G06K 15/00* (2006.01)
*H04N 1/387* (2006.01)
*G06K 15/02* (2006.01)

(52) U.S. Cl.
CPC ............ *H04N 1/387* (2013.01); *G06K 15/1889* (2013.01); *H04N 2201/0094* (2013.01)

(58) Field of Classification Search
CPC . G06F 3/1204; G06F 3/04883; G06F 3/1205; G06F 3/1225; G06F 9/44526; G06F 3/0317
USPC ................................. 358/1.1–3.29, 1.11–1.18
See application file for complete search history.

(56) References Cited

U.S. PATENT DOCUMENTS

2004/0168130 A1* 8/2004 Ishizaki ........................ 715/530

FOREIGN PATENT DOCUMENTS

JP         2007129424 A       5/2007

* cited by examiner

*Primary Examiner* — Marcellus Augustin
(74) *Attorney, Agent, or Firm* — Alleman Hall McCoy Russell & Tuttle LLP

(57) ABSTRACT

An image forming apparatus according to one aspect of the present disclosure includes pane information calculating portion, stamp drawing information calculating portion, and stamp drawing portion. Pane information calculating portion calculates pane information including recording sheet number information and drawing position information that indicate recording sheet number of recording sheet and drawing position in recording sheet at which an image of each page of obtained print data is to be formed. Stamp drawing information calculating portion calculates stamp drawing information including recording sheet number information and drawing position information that indicate recording sheet number of recording sheet and drawing position in recording sheet at which predetermined stamp is to be drawn in correspondence with pane information calculated by pane information calculating portion. Stamp drawing portion draws predetermined stamp at drawing position in recording sheet indicated by stamp drawing information calculated by stamp drawing information calculating portion.

3 Claims, 9 Drawing Sheets

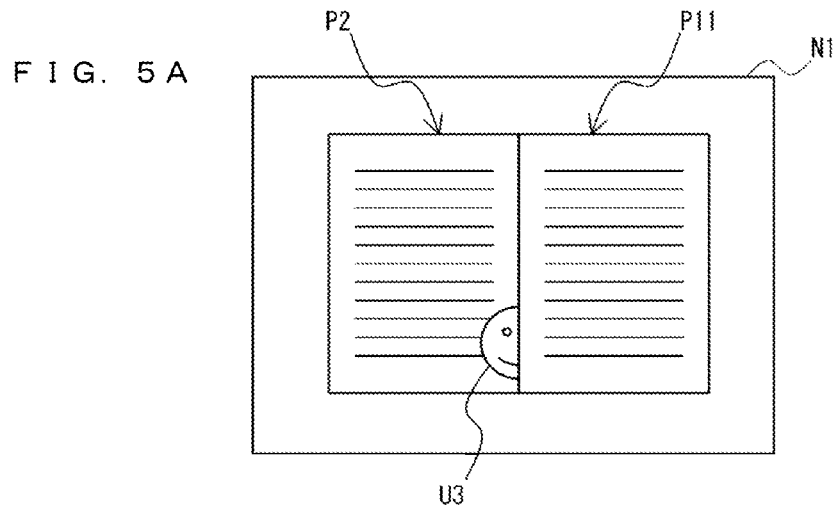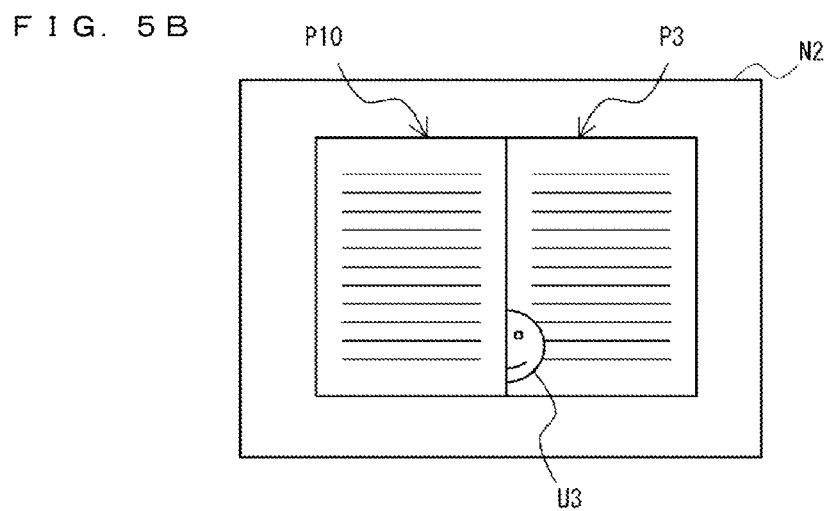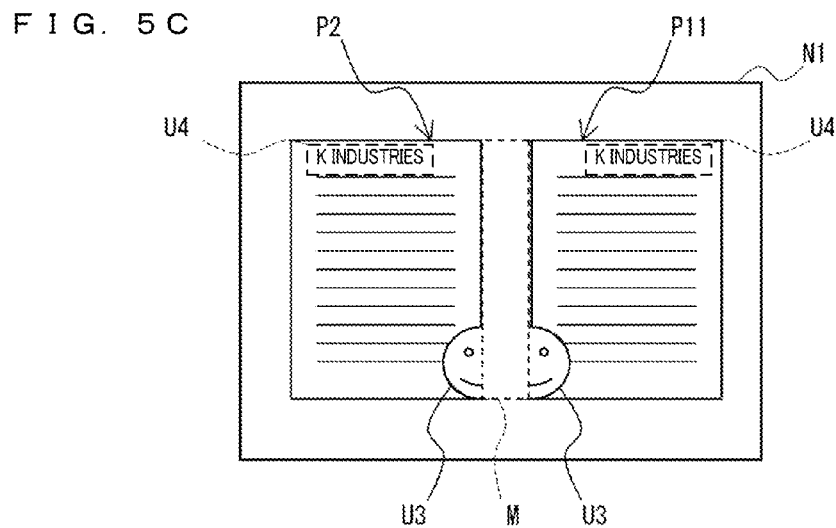

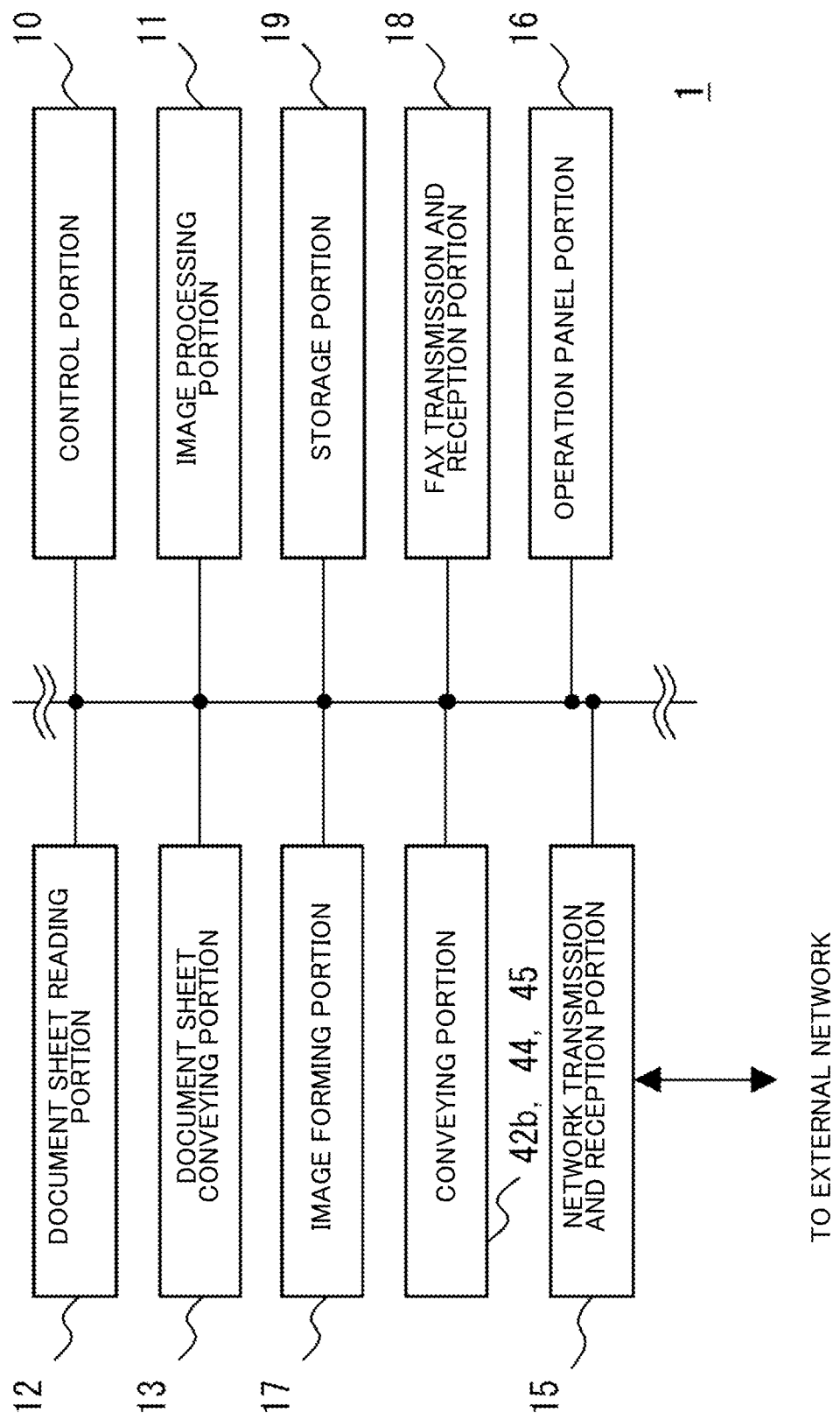

IMAGE FORMING APPARATUS CAPABLE OF DRAWING STAMP ON RECORDING SHEETS, AND IMAGE FORMING METHOD

INCORPORATION BY REFERENCE

This application is based upon and claims the benefit of priority from the corresponding Japanese Patent Application No. 2013-179377 filed on Aug. 30, 2013, the entire contents of which are incorporated herein by reference.

BACKGROUND

The present disclosure relates to an image forming apparatus and an image forming method, and in particular to an image forming apparatus and an image forming method having a stamp function for drawing a predetermined stamp on recording sheets.

Conventionally, there is known image forming apparatuses, such as an MFP (MultiFunction Peripheral), that can print documents and images. Some of the image forming apparatuses have a stamp function to draw a stamp at a predetermined position on a recording sheet on which an image or the like is printed, wherein the stamp is a predetermined image or character string, date, page number or the like.

There is known a typical composite image generation program that is capable of performing, at high speed, a process for "N-in-1" collective printing wherein a stamp is added. According to this typical program, to perform an "N-in-1" printing wherein the stamp is added, first, the composition position of the stamp is decided (decision process), and processing for converting a file etc., to be printed into intermediate data, judging the font size and composition position of a stamp image to be put together, and putting the stamp image together with the intermediate data is performed (composition process). Then the composite image for the "N-in-1" printing wherein intermediate data of N pages including the intermediate data that the stamp image is put together with on one sheet is generated (formation process).

SUMMARY

An image forming apparatus according to one aspect of the present disclosure includes a pane information calculating portion, a stamp drawing information calculating portion, and a stamp drawing portion. The pane information calculating portion calculates pane information including recording sheet number information and drawing position information that indicate a recording sheet number of a recording sheet and a drawing position in the recording sheet at which an image of each page of obtained print data is to be formed. The stamp drawing information calculating portion calculates stamp drawing information including recording sheet number information and drawing position information that indicate a recording sheet number of a recording sheet and a drawing position in the recording sheet at which a predetermined stamp is to be drawn in correspondence with the pane information calculated by the pane information calculating portion. The stamp drawing portion draws the predetermined stamp at the drawing position in the recording sheet indicated by the stamp drawing information calculated by the stamp drawing information calculating portion.

An image forming method according to another aspect of the present disclosure is applied to an image forming apparatus capable of forming an image of a predetermined stamp when an image of obtained print data is formed on a recording sheet. The image forming method calculates pane information including recording sheet number information and drawing position information that indicate a recording sheet number of a recording sheet and a drawing position in the recording sheet at which an image of each page of the print data is to be formed, calculates stamp drawing information including recording sheet number information and drawing position information that indicate a recording sheet number of a recording sheet and a drawing position in the recording sheet at which a predetermined stamp is to be drawn in correspondence with the calculated pane information, and draws the predetermined stamp at the drawing position in the recording sheet indicated by the calculated stamp drawing information.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 5A-5C show examples of performance of the per page stamp information calculating process and the drawing position changing process shown in FIG. 3.

FIG. 6 shows the structure of the image forming apparatus of the embodiment of the present disclosure.

DETAILED DESCRIPTION

[Structure of Image Forming Apparatus 1]

Figure 1:
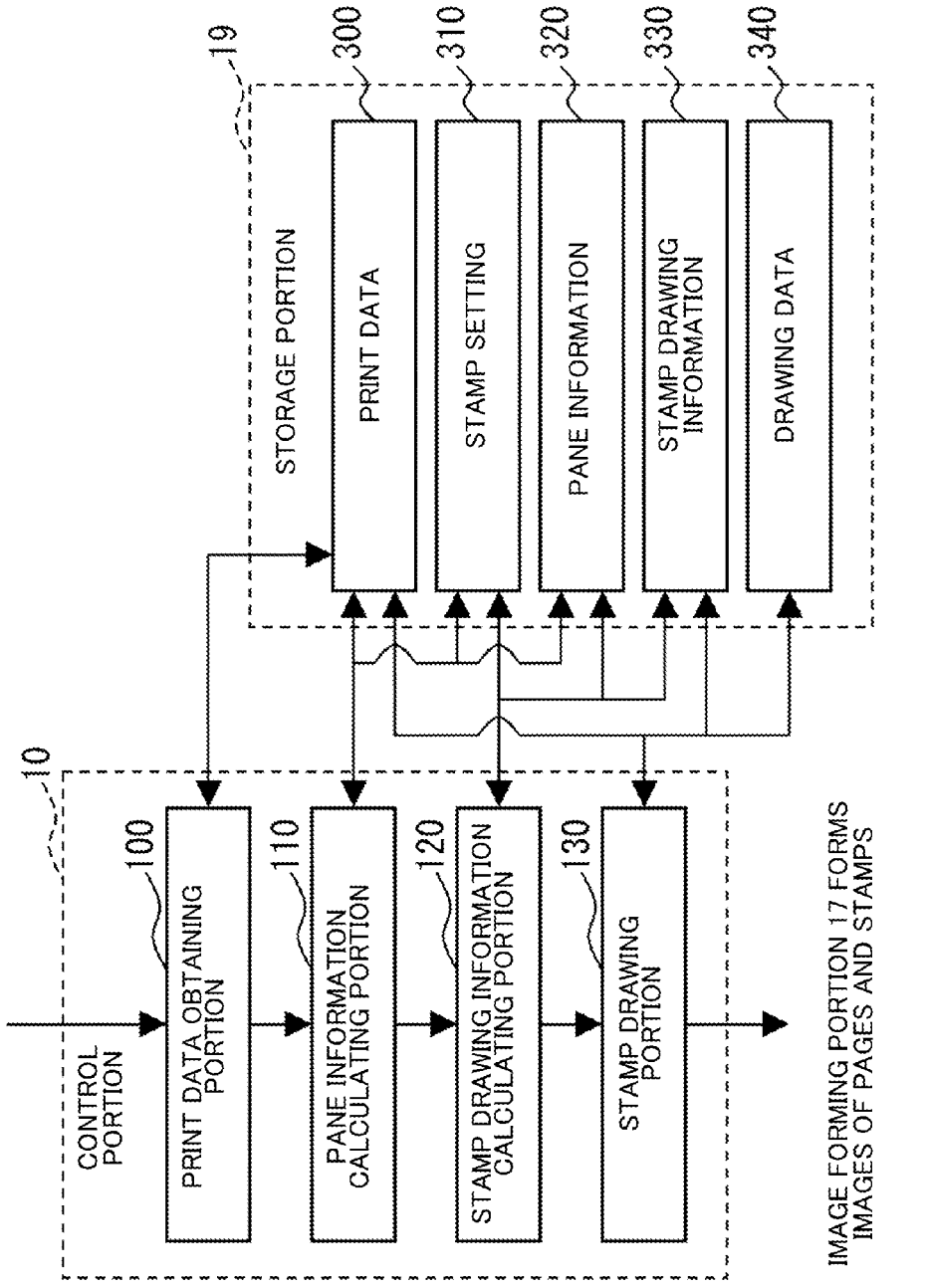
FIG. 1 shows the structure of a system including the image forming apparatus of the embodiment of the present disclosure.

First, the structure of an image forming apparatus 1 is described with reference to FIG. 6.

The image forming apparatus 1 includes an image processing portion 11, a document sheet reading portion 12, a document sheet conveying portion 13, a conveying portion (a sheet feed roller 42b, a conveying roller 44, a discharge roller 45), a network transmission and reception portion 15, an operation panel portion 16, an image forming portion 17, a FAX transmission and reception portion 18, a storage portion 19, and the like. These portions are connected to a control portion 10. These portions are controlled in operation by the control portion 10.

The control portion 10 is an information processing device such as a GPP (General Purpose Processor), a CPU (Central Processing Unit), an MPU (Micro Processing Unit), a DSP (Digital Signal Processor), a GPU (Graphics Processing Unit), an Application Specific Processor, an ASIC (Application Specific Integrated Circuit), or the like.

The control portion 10 reads out a control program stored in a ROM (Read Only Memory) or an HDD (Hard Disk Drive) of the storage portion 19, expands the program onto a RAM (Random Access Memory) and executes the expanded program. This causes the control portion 10 to operate as the functional portions constituting a functional block described below. In addition, the control portion 10 totally controls the image forming apparatus 1 in accordance with predetermined instruction information that is input from an external terminal (not shown) or the operation panel portion 16.

The image processing portion 11 is a control and arithmetic portion such as a DSP (Digital Signal Processor), a GPU (Graphics Processing Unit) or the like. The image processing portion 11 performs a predetermined image processing on image data. The image processing portion 11 performs various types of image processing such as the enlargement and reduction process, density adjustment, gradation adjustment, image improvement process and the like.

The image processing portion 11 stores images, which were read by the document sheet reading portion 12, into the storage portion 19 as print data 300. In doing this, the image processing portion 11 may convert the print data 300 into file units in the PDF format, TIFF format or other format.

The document sheet reading portion 12 reads (scans) a set document sheet. The document sheet conveying portion 13 conveys a document sheet so that it is read by the document sheet reading portion 12. The image forming portion 17 forms an image on a recording sheet based on predetermined data in accordance with an output instruction by the user. The predetermined data is, for example, data stored in the storage portion 19, data read by the document sheet reading portion 12, or data obtained from the external terminal. The conveying portion conveys a recording sheet from a sheet feed cassette 42a (see FIG. 7), and conveys a recording sheet with an image formed thereon by the image forming portion 17, to a stack tray 50. It is noted that the operations of the document sheet reading portion 12, document sheet conveying portion 13, conveying portion, and image forming portion 17 are described below.

The network transmission and reception portion 15 is a network connection portion. The network transmission and reception portion 15 includes a LAN board, a wireless transmission and reception device or the like for the connection to an external network such as a LAN, a wireless LAN, a WAN, or a mobile phone network. The network transmission and reception portion 15 transmits and receives data via a data communication line, and transmits and receives audio signals via an audio telephone line.

The operation panel portion 16 includes a display portion such as an LCD, numeric keys, a START button, a CANCEL button, a button for switching among operation modes such as copy, FAX transmission, scanner and the like, a button for instructing a job execution such as printing, transmitting, storing, and recording of a selected document sheet, and an input portion such as a touch panel.

The operation panel portion 16 obtains a restoration signal when a button, a touch panel or the like is pressed or from a connected human sensor (not shown) or the like during a power saving state, and transmits the restoration signal to each portion including the control portion 10 to restore each portion from the power saving state.

The operation panel portion 16 is configured to obtain, from the user, instructions for various types of jobs to be performed by the image forming apparatus 1. In addition, it is possible to input or change information of a user in accordance with an instruction obtained by the operation panel portion 16 from the user.

The storage portion 19 is a storage device using a semiconductor memory such as a ROM, a RAM or the like and a recording medium such as an HDD or the like.

The RAM in the storage portion 19 keeps on storing data/information even in the power saving state, owing to the function such as the self refresh.

A control program for controlling the operation of the image forming apparatus 1 is stored in the ROM or HDD in the storage portion 19. In addition, the storage portion 19 stores account settings of the users. The storage portion 19 may include areas for storing folders for each user.

It is noted that in the image forming apparatus 1, the control portion 10 and the image processing portion 11 may be formed as one portion, such as a CPU embedded in a GPU, a chip-on-module package or the like. In addition, the control portion 10 and the image processing portion 11 may include a RAM, a ROM, a flash memory or the like. Furthermore, the image forming apparatus 1 may include a FAX transmission and reception portion for transmitting and receiving facsimiles.

[Operation of Image Forming Apparatus 1]

Figure 7:
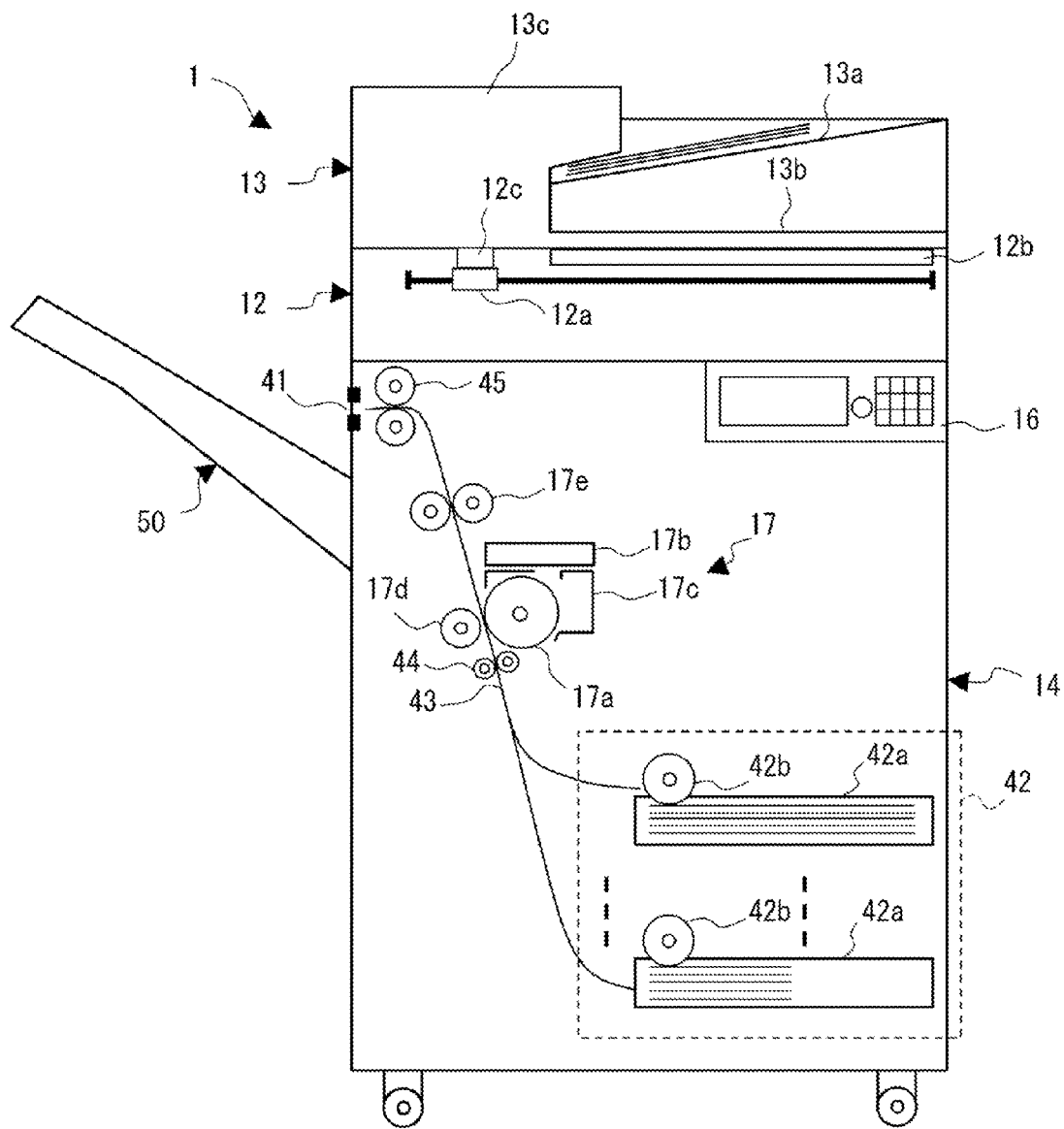
FIG. 7 shows the structure of the image forming apparatus of the embodiment of the present disclosure.

Next, the operation of the image forming apparatus 1 in the embodiment of the present disclosure is explained with reference to FIG. 7.

The document sheet reading portion 12 is disposed on a main body 14, and the document sheet conveying portion 13 is disposed on the document sheet reading portion 12. The stack tray 50 is disposed on the side of a discharge outlet 41, wherein the discharge outlet 41 is formed in the main body 14 to discharge the recording sheets. The operation panel portion 16 is disposed on the front side of the image forming apparatus 1.

The document sheet reading portion 12 includes a scanner 12a, a platen glass 12b, and a document sheet reading slit 12c. The scanner 12a includes an exposure lamp, an imaging sensor such as a CCD (Charge Coupled Device), a CMOS (Complementary Metal Oxide Semiconductor) or the like, and is configured to be able to move in a direction in which the document sheet is conveyed by the document sheet conveying portion 13.

The platen glass 12b is a document sheet table made of a transparent material such as glass. The document sheet reading slit 12c has a slit formed in a direction perpendicular to the direction in which the document sheet is conveyed by the document sheet conveying portion 13.

To read a document sheet placed on the platen glass 12b, the scanner 12a is moved to a position facing the platen glass 12b, obtains image data by scanning and reading the document sheet placed on the platen glass 12b, and outputs the obtained image data to the control portion 10 (see FIG. 6) of the main body 14.

To read a document sheet conveyed by the document sheet conveying portion 13, the scanner 12a is moved to a position facing the document sheet reading slit 12c. The scanner 12a then obtains image data by reading the document sheet via the document sheet reading slit 12c in synchronization with the conveyance of the document sheet by the document sheet conveying portion 13, and outputs the obtained image data to the control portion 10 of the main body 14.

The document sheet conveying portion 13 includes a document sheet placing portion 13a, a document sheet discharging portion 13b, and a document sheet conveying mechanism 13c. Document sheets placed on the document sheet placing portion 13a are fed one by one in order by the document sheet conveying mechanism 13c and conveyed to a position facing the document sheet reading slit 12c, and subsequently discharged to the document sheet discharging portion 13b. It is noted that the document sheet conveying portion 13 is configured to be tiltable, and lifting the document sheet conveying portion 13 upward opens the upper surface of the platen glass 12b for use.

The main body 14 includes a sheet feed portion 42, a paper sheet conveying path 43, a conveying roller 44, and a discharge roller 45, as well as the image forming portion 17. The sheet feed portion 42 includes a plurality of sheet feed cassettes 42a and sheet feed rollers 42b. The sheet feed cassettes 42a are capable of housing recording sheets of different sizes or directions respectively. The sheet feed rollers 42b feed recording sheets one by one from the sheet feed cassettes 42a to the paper sheet conveying path 43. The sheet feed rollers 42b, conveying roller 44, and discharge roller 45 function as a conveying portion. The recording sheet is conveyed by this conveying portion.

The recording sheet fed to the paper sheet conveying path 43 by the sheet feed roller 42b is conveyed to the image forming portion 17 by the conveying roller 44. An image is formed on the recoding sheet by the image forming portion 17, and the recording sheet with the image formed thereon is discharged to the stack tray 50 by the discharge roller 45.

The image forming portion 17 includes a photoconductor drum 17a, an exposure portion 17b, a developing portion 17c, a transfer portion 17d, and a fixing portion 17e. The exposure portion 17b is an optical unit including a laser device, a mirror, a lens, an LED array and the like. The exposure portion 17b outputs light or the like based on the image data so that the photoconductor drum 17a is exposed and an electrostatic latent image is formed on the surface of the photoconductor drum 17a. The developing portion 17c is a developing unit that develops, by using toner, the electrostatic latent image formed on the photoconductor drum 17a, and forms a toner image on the surface of the photoconductor drum 17a based on the electrostatic latent image. The transfer portion 17d transfers the toner image, which has been formed on the surface of the photoconductor drum 17a by the developing portion 17c, onto a recording sheet. The fixing portion 17e fixes the toner image on the recording sheet by heating the recording sheet on which the toner image has been transferred by the transfer portion 17d.

The FAX transmission and reception portion 18 performs transmission and reception of facsimiles. The FAX transmission and reception portion 18 is connected to a telephone line, an ISDN line or the like. The FAX transmission and reception portion 18 stores received facsimile image in the storage portion 19. Furthermore, the FAX transmission and reception portion 18 may transmit a facsimile of the image data stored in the storage portion 19, instead of allowing the image forming portion 17 to record the image data on a recording sheet.

Figure 8A:
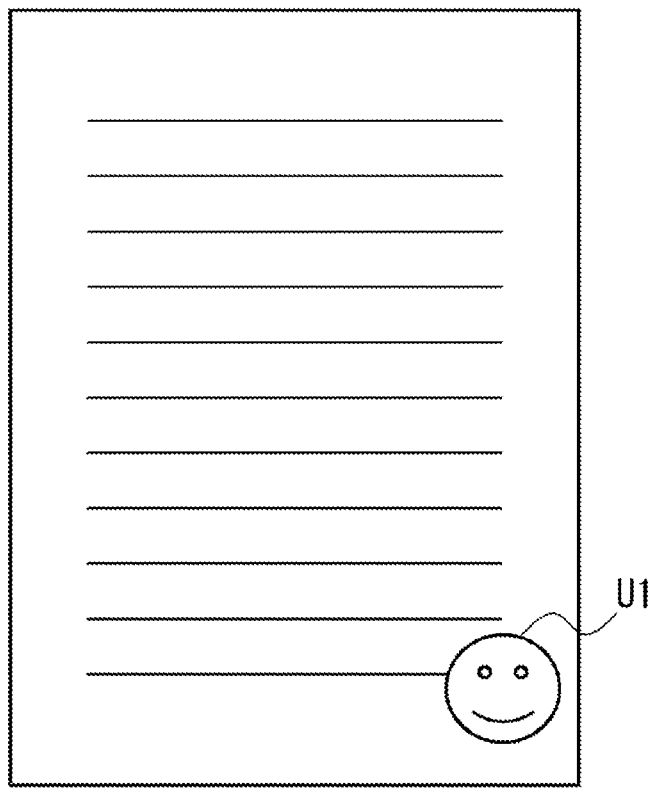
FIGS. 8A and 8B show examples of conventional stamp drawing.
Figure 8B:
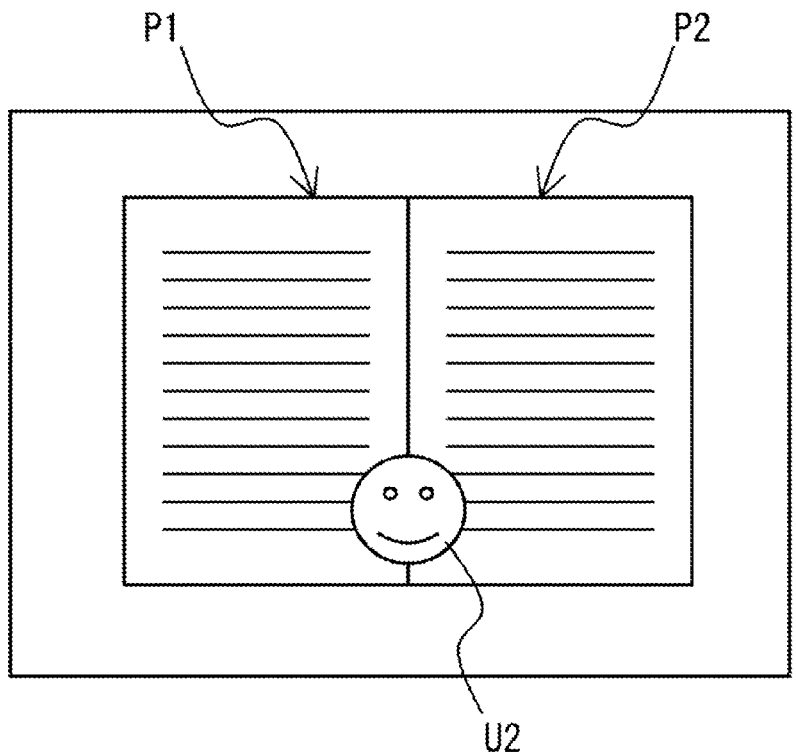

As a typical example of the image forming apparatus 1 having the above-described structure, there is known an image forming apparatus having a stamp function for drawing a stamp, which is a predetermined image or character string, date, page number or the like, at a predetermined position on a recording sheet on which an image or the like is printed. As shown in FIG. 8A, by using the typical stamp function, it is possible to draw a stamp U1 at the bottom of the recording sheet. In addition, as shown in FIG. 8B, by using the typical stamp function, it is possible to draw a stamp U2 spanning a plurality of pages in the collective printing as far as the pages are included in the same recording sheet.

However, the above-mentioned typical stamp function has a problem that a stamp spanning different recording sheets cannot be drawn. Here, an explanation of how the problem occurs in the booklet printing is given with reference to FIGS. 9A-9C.

Figure 9A:
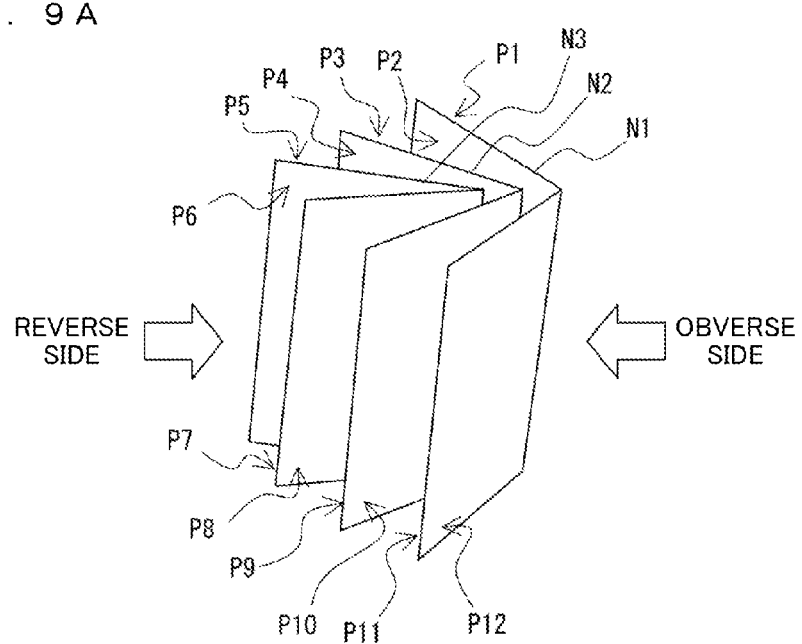
FIGS. 9A-9C show examples of conventional stamp drawing in the booklet printing.
Figure 9B:
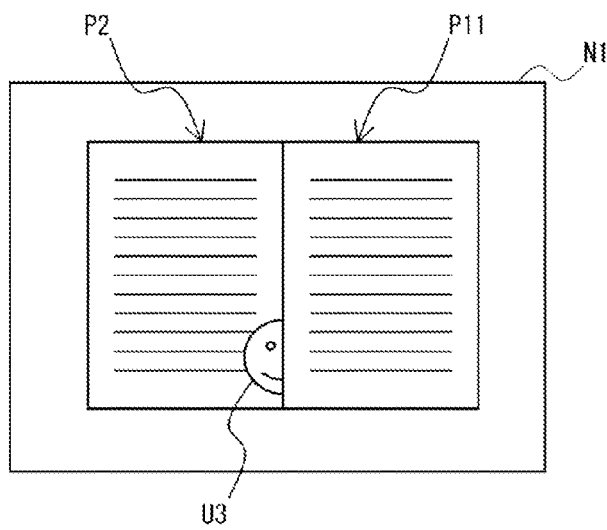
Figure 9C:
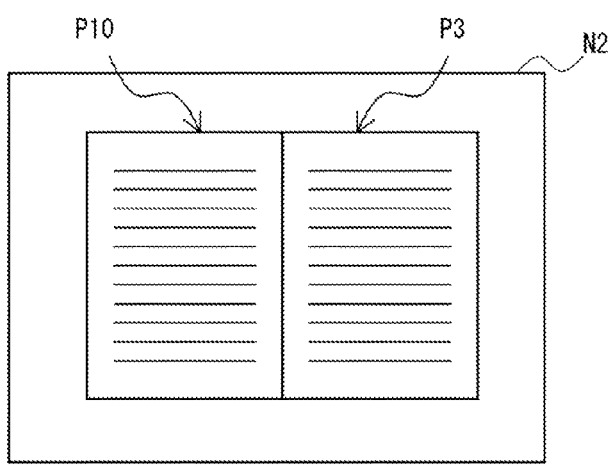

FIG. 9A shows an example of the booklet printing in which three recording sheets are printed in order from recording sheet N1 to recording sheet N3, and after the image formation, the recording sheets are folded into a booklet. In this case, images of pages P1-P12 are formed in the shown alignment. FIG. 9B shows an example of an image formed on the rear surface of the recording sheet N1, and FIG. 9C shows an example of an image formed on the front surface of the recording sheet N2. In the completed booklet, pages P2 and P3 are to be adjacent to each other in spread. However, in printing before completion of the booklet, the pages P2 and P3 are printed on different recording sheets. As a result, with the typical stamp function, stamp U3 spanning pages cannot be drawn correctly, but is drawn as an incorrect print image on the recording sheets as shown in FIGS. 9B and 9C.

The image forming apparatus 1 of the present disclosure has a structure for solving this problem. The following explains the structure of the image forming apparatus 1 in more detail.

[System Structure of Image Forming Apparatus 1]

Figure 2:
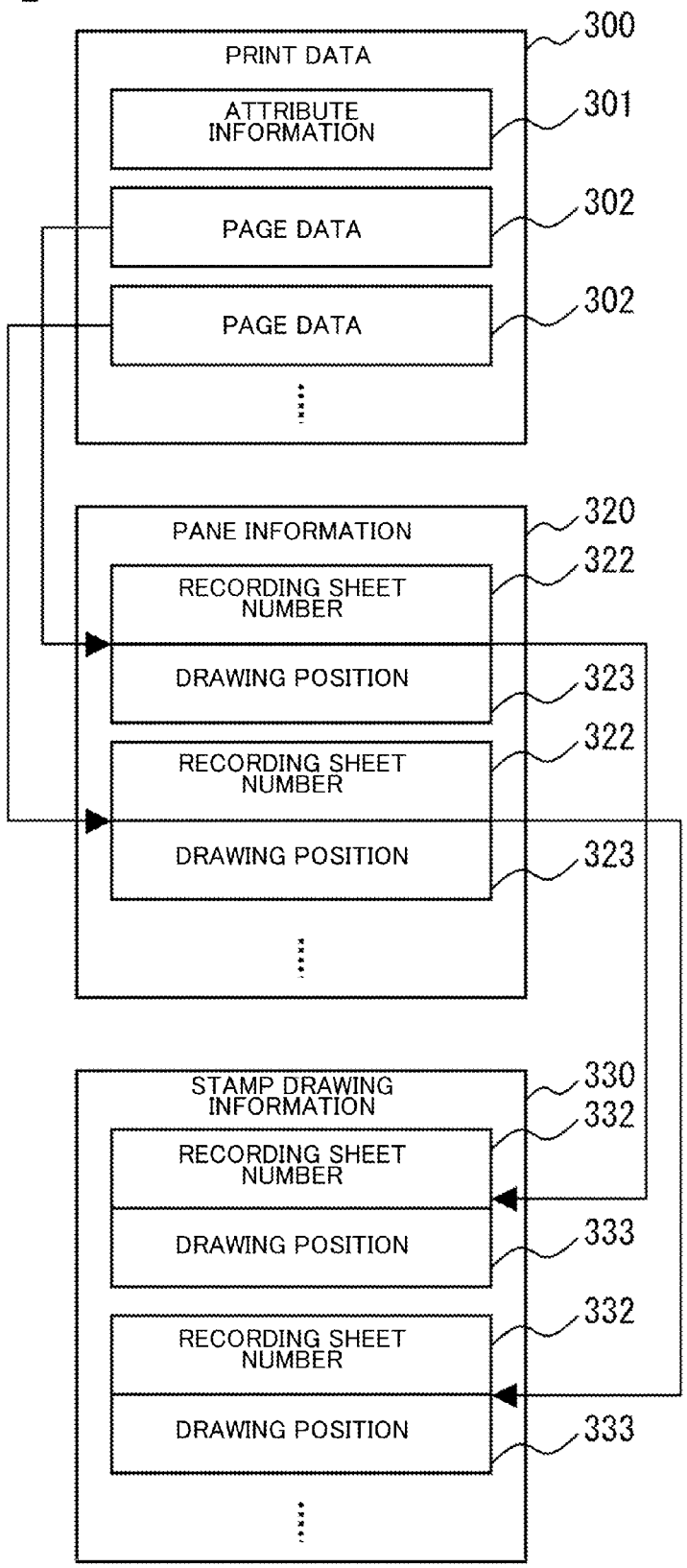
FIG. 2 shows details of the pane information and the stamp drawing information shown in FIG. 1.

The system structure of the image forming apparatus 1 is explained with reference to FIGS. 1 and 2.

The image forming apparatus 1 includes a print data obtaining portion 100, a pane information calculating portion 110, a stamp drawing information calculating portion 120, and a stamp drawing portion 130.

The storage portion 19 stores print data 300, stamp setting 310, pane information 320, stamp drawing information 330, and drawing data 340.

The print data obtaining portion 100 obtains the print data 300 from the document sheet reading portion 12, the FAX transmission and reception portion 18, a terminal (not shown), an external recording medium (not shown) and the like, and stores the print data 300 in the storage portion 19. In addition, the print data obtaining portion 100 sets the stamp setting 310 in accordance with a user instruction from the operation panel portion 16 or the external terminal, and stores the stamp setting 310 in the storage portion 19.

The pane information calculating portion 110 calculates the pane information 320 for each page of the print data 300. The panes indicate drawing sections on a recording sheet in which pages are drawn respectively. The pane information calculating portion 110 reads out attribute information 301 from the print data 300. The pane information calculating portion 110 calculates a recording sheet number 322 and a drawing position 323 in correspondence with the printing method specified in the read-out attribute information 301, wherein the recording sheet number 322 and the drawing position 323 indicate the recording sheet number of the recording sheet and the drawing position on which the image of each page of page data 302 is formed by the image forming portion 17. The pane information calculating portion 110 stores the recording sheet number 322 and the drawing position 323 for each page as the pane information 320 in the storage portion 19.

The stamp drawing information calculating portion 120 calculates, for each stamp, a recording sheet number 332 of a recording sheet on which a stamp is drawn and a drawing position 333 of the stamp on the recording sheet, by referring to the pane information 320 and the stamp setting 310. The stamp drawing information calculating portion 120 stores the recording sheet number 332 and the drawing position 333 calculated for each stamp as the stamp drawing information 330 in the storage portion 19.

In addition, the stamp drawing information calculating portion 120 changes the drawing position of the stamp by changing the drawing position 333 of the stamp drawing information 330 in correspondence with the drawing position 323 of the pane information 320.

The stamp drawing portion 130 draws a stamp at the drawing position 333 on a recording sheet of a recording sheet number 333 that corresponds to the stamp drawing information 330 calculated by the stamp drawing information calculating portion 120. If the drawing position 333 of the stamp information has been changed by the stamp drawing information calculating portion 120, the stamp drawing portion 130 draws the stamp at the changed drawing position 333. Furthermore, the stamp drawing portion 130 may also draw the print data 300 at the drawing position 323 on the recording sheet that corresponds to the pane information 320.

The print data 300 is data of image/document obtained by the print data obtaining portion 100. The data of image/document of the print data 300 may be: bit-map image data read by the document sheet reading portion 12 or the FAX transmission and reception portion 18; data of a PDL (Page Description Language) document obtained from an external terminal or recording medium; data of a PDF (Portable Document Format) document; image data in a format such as jpg, GIF, TIFF or the like.

The stamp setting 310 is data indicating the setting of the stamp to be formed on a recording sheet when images of the print data 300 are formed. The stamp setting 310 includes: data of image or character to be drawn; and information of the setting of the stamp. The image data and character data of the stamp setting 310 includes data of image and character that are drawn as stamp, watermark, cover, or regular shape data. The information of the stamp setting 310 includes data of the page number of the page in which the stamp is added, date, character string or image specified by the user, specification of the drawing position, angle, fine adjustment position (margin position) of the character string or image, change setting for specifying change in the drawing position in the double-page spread and bookbinding printing, and the like. It is noted that the stamp setting 310 may be included in the print data 300.

The pane information 320 is data indicating the correspondence between the pages and the recording sheets on which images of the pages are formed. The pane information 320 includes, as the correspondence, data indicating at which position on which of a front surface or a rear surface of what number of recording sheet, each page is printed when images of the print data 300 are formed on recording sheets.

The stamp drawing information 330 is data indicating the correspondence between the stamps and the panes. The stamp drawing information 330 includes, as the correspondence, data indicating at which position on which of a front surface or a rear surface of what number of recording sheet, a stamp is printed when images of the print data 300 are formed on recording sheets.

The drawing data 340 is: bit map data which is generated by the stamp drawing portion 130 by, for example, rasterizing (drawing) the print data 300 and drawing a stamp thereon; or data which is generated by compressing the bit map data by the run-length or the like. It is noted that the drawing data 340 may be bit map data or the like to be transmitted by facsimile by the FAX transmission and reception portion 18. In addition, the drawing data 340 may be a file in a PDF format or the like. Furthermore, the drawing data 340 may be divided for each of the colors that are used in the transmission to the image forming portion 17, or may be divided in predetermined units called bands or the like.

The print data 300, pane information 320, and stamp drawing information 330 are described in detail with reference to FIG. 2.

The print data 300 includes attribute information 301 and one or more pieces of page data 302.

The attribute information 301 of the print data 300 is data indicating attributes of the print data 300 as a whole. The attributes of the print data 300 may include a printing method, a print sheet size, position and size of margins and mark lines, color or monochrome print type, password specification, file name, file type, creation time, update time, browsing time, etc. In addition, the printing method of the print data 300 may include: one-side/double-side printing; specification of binding such as right binding, left binding, short-side binding, long-side binding and the like; collective printing such as "N-in-1"; booklet printing; poster printing; bookbinding printing; presence/absence of specification of post-processing such as stapling; and the like.

The page data 302 is data of each page of the print data 300. The data of each page of the page data 302 may include PDL data and image data, various types of setting data for each page, metadata, property information and the like.

The pane information 320 includes the recording sheet number 322 and the drawing position 323 of each of one or more panes that respectively correspond to the one or more pieces of page data 302 of the print data 300.

The recording sheet number 322 is a value indicating on which of a front surface or a rear surface of what number of recording sheet, the image of each piece of page data 302 is formed by the image forming portion 17.

The drawing position 323 is data indicating the drawing position of the pane of each piece of page data 302 on the recording sheet. The drawing position of the drawing position 323 may be represented by using, for example, coordinate data of a rectangle extending from an upper-left corner to a lower-right corner in the drawing data 340 (see FIG. 1).

The stamp drawing information 330 includes a recording sheet number 332 and a drawing position 333 of each stamp that corresponds to each pane of the pane information 320.

The recording sheet number 332 is a value indicating on which of a front surface or a rear surface of what number of recording sheet, the image of each stamp is formed by the image forming portion 17.

The drawing position 333 is data indicating the drawing position of each stamp on the recording sheet. The drawing position of the drawing position 333 may also be represented by using, for example, coordinate data of a rectangle extending from an upper-left corner to a lower-right corner in the drawing data 340.

The control portion 10 of the image forming apparatus 1 functions as the print data obtaining portion 100, pane information calculating portion 110, stamp drawing information calculating portion 120, and stamp drawing portion 130, by executing a control program stored in the storage portion 19. In addition, the above-described portions of the image forming apparatus 1 are hardware resources for performing the image forming method of the present disclosure.

[Stamp Drawing Process by Image Forming Apparatus 1]

Next, a stamp drawing process performed by the image forming apparatus 1 in the embodiment of the present disclosure is explained with reference to FIGS. 3-5C.

In the stamp drawing process of the present embodiment, the pane information 320 is calculated, and then the stamp drawing information 330 indicating whether a stamp is drawn is calculated based on the pane information 320, and the image of the stamp is formed, for example, to match the booklet printing. The stamp drawing process of the present embodiment is realized as the control portion 10 mainly executes a program stored in the storage portion 19 in cooperation with other portions by using the hardware resources.

Figure 3:
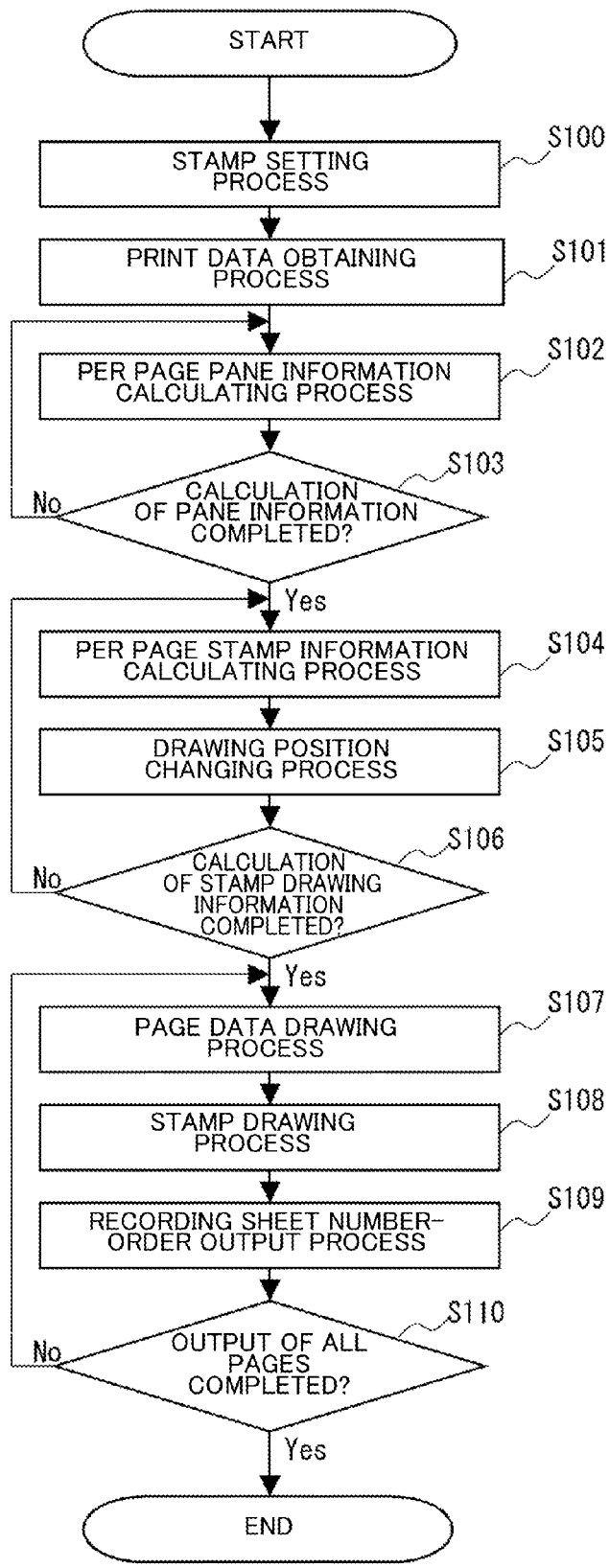
FIG. 3 shows a flowchart of the stamp drawing process in the embodiment of the present disclosure.

The following describes the stamp drawing process in detail with reference to the flowchart shown in FIG. 3.

(Step S100)

Figure 4:
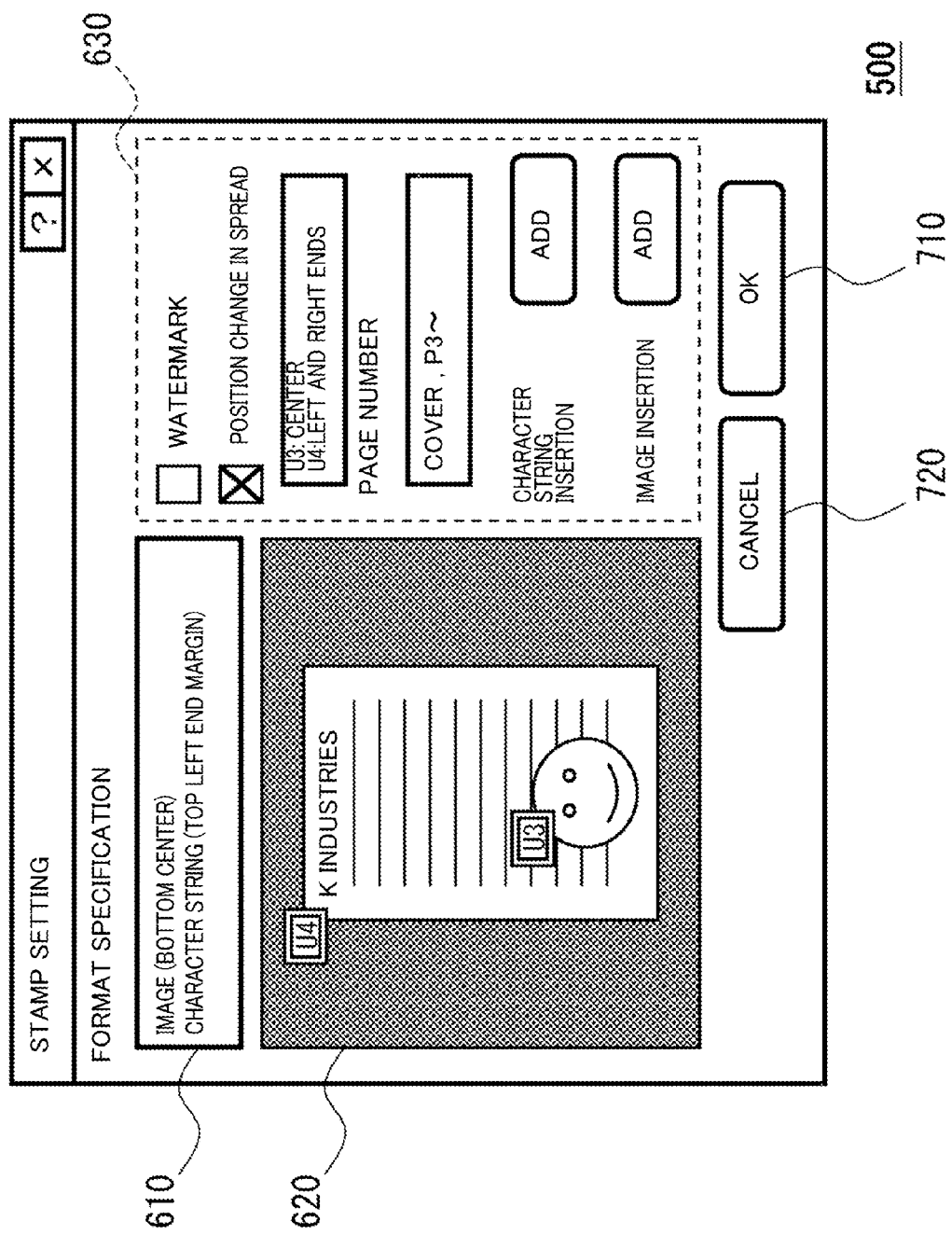
FIG. 4 shows an example of a screen used in the stamp setting process shown in FIG. 3.

First, the control portion 10 performs a stamp setting process by using the print data obtaining portion 100. The following description is given with reference to FIG. 4. The control portion 10 allows the user to perform the setting of the stamp on the operation panel portion 16. A screen example 500 shown in FIG. 4 is an example of a setting screen for the stamp setting displayed on the operation panel portion 16. A display field 610 is an input field in which the format of the stamp to be set is specified in a predetermined description language or the like. A display field 620 is an input field in which a preview screen of the stamp to be set is displayed. A display field 630 is a specification field in which it is possible to specify: the type of the stamp such as watermark or cover; whether or not the drawing position of the stamp is changed in the double-page spread or the like; page number; date; character string; image and the like.

A button 710 is a button for completing the setting. Upon detecting depression of the button 710, the control portion 10 stores the set stamp in the storage portion 19 as the stamp setting 310. A button 720 is a button for cancelling the setting. Upon detecting depression of the button 720, the control portion 10 ends the setting screen without storing the stamp setting 310.

It is noted that the stamp setting may be performed by a not-shown external terminal. In that case, a GUI (Graphical User Interface) of the device driver may perform the setting of the stamp, and the stamp setting 310 may be included in the print data 300. In addition, the control portion 10 may read the stamp setting 310 that has already been set, from an external recording medium (not shown).

(Step S101)

Next, the control portion 10 performs a print data obtaining process by using the print data obtaining portion 100. The control portion 10 causes the document sheet reading portion 12 to read the document sheet set in the document sheet conveying portion 13, obtains the image data thereof as the print data 300, and stores the print data 300 in the storage portion 19.

In addition, the control portion 10 may obtain, as the print data 300, image data of a document sheet or the like received by facsimile from the FAX transmission and reception portion 18, and store the print data 300 in the storage portion 19. Furthermore, the control portion 10 may cause the network transmission and reception portion 15 to receive the print data 300, which has been output by a device driver from one of various types of application software of an external terminal, via an external network, and store the print data 300 in the storage portion 19. Furthermore, the control portion 10 may obtain the print data 300 from a connected recording medium (not shown), and store the print data 300 in the storage portion 19.

It is noted that the control portion 10 may obtain a user ID and a password by allowing the user to input them via the input portion of the operation panel portion 16 or a terminal, and perform a user authentication. Furthermore, the control portion 10 may perform a user authentication by using an IC card or the like.

(Step S102)

Subsequently, the control portion 10 performs a per page pane information calculating process by using the pane information calculating portion 110. The control portion 10 calculates the recording sheet number 322 of a recording sheet, on which an image is to be formed, and the drawing position 323, for each piece of page data 302 included in the obtained print data 300, and stores the recording sheet number 322 and the drawing position 323 as the pane information 320 in the storage portion 19.

The control portion 10 refers to, for example, the printing method specified in the attribute information 301 of the print data 300, and calculates on which of a front surface or a rear surface of what number of recording sheet, the panes of each piece of page data 302 are disposed. In addition, the control portion 10 calculates the size and position of each pane by referring to the information of the position and size of margins and mark lines included in the printing method.

For example, in the example of the booklet printing shown in FIGS. 9A-9C, the control portion 10 calculates as follows: the recording sheet number 322 of the pane information 320 for page P1 indicates the front surface of recording sheet N1, and the drawing position 323 indicates the right side; the recording sheet number 322 of the pane information 320 for page P2 indicates the rear surface of recording sheet N1, and the drawing position 323 indicates the left side; the recording sheet number 322 of the pane information 320 for page P3 indicates the front surface of recording sheet N2, and the drawing position 323 indicates the right side;

(Step S103)

Next, the control portion 10 determines whether or not the pane information calculating portion 110 has completed the calculation of the pane information 320. When the calculation of the pane information 320 for all pieces of page data 302 included in the print data 300 has been completed, the control portion 10 determines as Yes. Otherwise, the control portion 10 determines as No. When determined as Yes, the control portion 10 causes the process to proceed to step S104. When determined as No, the control portion 10 returns the process to step S102 and continues the calculation of the pane information 320.

(Step S104)

When it is determined that the calculation of the pane information 320 for all pages has been completed, the control portion 10 performs a per page stamp information calculating process by using the stamp drawing information calculating portion 120. The control portion 10 reads out the stamp setting 310 and retrieves on what page of the print data 300 the stamp is to be drawn. The control portion 10 makes the recording sheet number 322 and the drawing position 323 of the pane information 320 of the retrieved page data 302 correspond to the recording sheet number 332 and the drawing position 333 of the stamp drawing information 330. Furthermore, the control portion 10 makes the recording sheet number 322 of the pane information 320, which corresponds to a target page, correspond to the recording sheet number 332 of the stamp, and calculates the drawing position 333 from the drawing position 323.

The following describes an example where the stamp setting 310 has been made for a stamp U3 to be drawn in the bottom center of the recording sheet, and the booklet printing has been set, with reference to FIGS. 5A and 5B in correspondence with the example shown in FIGS. 9A-9C.

As shown in FIG. 5A, the control portion 10, for example, makes the recording sheet number 332 of the stamp drawing information 330, indicating the rear surface of the sheet number N1, correspond to the page data 302 of page P2. As shown in FIG. 5B, similarly, the control portion 10 makes the recording sheet number 332, indicating the front surface of the sheet number N2, correspond to the page data 302 of page P3. In this way, even when page P2 and page P3 are printed on different recording sheets in the double-page spread and booklet printing, the control portion 10 can set the drawing position 333 so that the stamp U3 is drawn in the center of the bottom of the sheet. That is, the control portion 10 is able to set the recording sheet numbers 332 and the drawing positions 333 of the stamp drawing information 330 in correspondence with different recording sheet numbers 322.

(Step S105)

Subsequently, the control portion 10 performs a drawing position changing process by using the stamp drawing information calculating portion 120.

Upon referring to the change setting in the stamp setting 310 or the like and finding that the drawing position needs to be changed due to the double-page spread setting or the like, the control portion 10 changes the drawing position 333 of the stamp drawing information 330. In doing this, the control portion 10 refers to the attribute information 301 of the print data 300, and moves the drawing position 333 of the stamp drawing information 330 rightward or leftward depending on, for example, which of the left or right page of the double-page spread the drawing position of the pane information 320 that corresponds to the recording sheet number 332 of the stamp drawing information 330 is set to.

As shown in FIG. 5C, the drawing position of a stamp U4 that has been set to move between the right and the left of the double-page spread is changed to the left end position in page P2, and to the right end position in page P11.

Furthermore, in the case where a margin M, which is, for example, a binding margin, has been set in the attribute information 301 of the print data 300, the drawing position of stamp U3 is changed from the center of a recording sheet to two positions horizontally separated from each other with the center in between.

(Step S106)

Next, the control portion 10 determines whether or not the stamp drawing information calculating portion 120 has completed the calculation of the stamp drawing information 330. When the calculation of the stamp drawing information 330 for all pages of the print data 300 set in the stamp setting 310 has been completed, the control portion 10 determines as Yes. Otherwise, the control portion 10 determines as No. When determined as Yes, the control portion 10 causes the process to proceed to step S107. When determined as No, the control portion 10 returns the process to step S104 and continues the calculation of the stamp drawing information 330.

(Step S107)

When it is determined that the calculation of the stamp drawing information 330 has been completed, the control portion 10 performs a page data drawing process by using the stamp drawing portion 130.

The control portion 10 draws the PDL, image data or the like of each piece of page data 302 at a location in the drawing data 340 that corresponds to the recording sheet number 322 and the drawing position 323 of the pane information 320 that correspond to the target piece of page data 302. In doing this, the control portion 10 performs a drawing based on the attribute information 301 of the print data 300. In addition, the control portion 10 may perform enlargement or reduction in the drawing based on the data of the rectangle of the drawing position 323.

(Step S108)

Subsequently, the control portion 10 performs a stamp drawing process by using the stamp drawing portion 130. When there is stamp drawing information 330 that corresponds to the pane information 320 of each piece of page data 302, the control portion 10 draws a stamp at a location in the drawing data 340 that corresponds to the drawing position 333 of the recording sheet number 332.

(Step S109)

Next, the control portion 10 performs a recording sheet number-order output process by using the stamp drawing portion 130. Upon completion of the drawing of the drawing data 340, the control portion 10 causes the image forming portion 17 to form images of the drawing data 340 onto recording sheets in order of the recording sheet number. In the case of the double-side printing, the control portion 10 causes images to be formed on both of the front and rear surfaces of each recording sheet.

In addition, the control portion 10 may cause the FAX transmission and reception portion 18 to transmit the drawing data 340 by facsimile. Furthermore, the control portion 10 may convert the drawing data 340 to the PDF format and output it to a document box in the storage portion 19, or to an external terminal or recording medium.

(Step S110)

Next, the control portion 10 determines, by using the stamp drawing portion 130, whether or not the output of recording sheets for all pages has been completed. When the output of recording sheets for all pages of the print data 300 has been completed, with images or the like having been formed on the recording sheets, the control portion 10 determines as Yes. Otherwise, the control portion 10 determines as No. When determined as Yes, the control portion 10 ends the stamp drawing process. When determined as No, the control portion 10 returns the process to step S107 and continues the drawing of the page data 302 and the stamp and the output of recording sheets.

This completes the stamp drawing process in the embodiment of the present disclosure.

With the above-described structure, the following effects can be produced. According to the above-described typical stamp function, drawing a stamp spanning pages in the booklet printing or the like is not possible. On the other hand, the image forming apparatus 1 in the embodiment of the present disclosure includes the pane information calculating portion 110, stamp drawing information calculating portion 120 and stamp drawing portion 130. With this structure, the stamp drawing information 330 is calculated to indicate, for each pane, whether a stamp is drawn, and thus it is possible to realize a process of drawing a stamp spanning different recording sheets even in the booklet printing or the like. This facilitates, for example, specifying matching faces in the booklet, and improves usability of the user.

In addition, in the image forming apparatus 1 of the embodiment of the present disclosure, the stamp drawing information calculating portion 120 can change the drawing position of the stamp in correspondence with the drawing position of the pane information 320. This makes it possible to draw a stamp of a page number, name or the like in the left and right ends of a double-page spread in the booklet printing or the like. This improves usability in the booklet printing or the like.

It is noted that although, in the embodiment of the present disclosure, realization of a stamp spanning pages in the booklet printing is explained as one example, the present disclosure is similarly applicable to the poster printing, bookbinding printing, and the like. In addition, with regard to the collective printing, the present disclosure is applicable to printing methods for collecting three or more pages, such as "3-in-1", "4-in-1", "6-in-1", "8-in-1" and the like, as well. This ensures that stamps are drawn at all locations where the stamps are required. For example, in the case of the poster printing, it is possible to specify locations at which different recording sheets are to be joined together, by drawing the stamps there. This makes it possible to create a large poster easily by joining a plurality of recording sheets together.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:
    a pane information calculating portion configured to calculate pane information including recording sheet number information and drawing position information that indicate a recording sheet number of a recording sheet and a drawing position in the recording sheet at which an image of each page of obtained print data is to be formed;
    a stamp drawing information calculating portion configured to calculate stamp drawing information including recording sheet number information and drawing position information that indicate a recording sheet number of a recording sheet and a drawing position in the recording sheet at which a predetermined stamp is to be drawn in correspondence with the pane information calculated by the pane information calculating portion;
    wherein the pane information further includes data indicating at which position on which of a front surface or a rear surface of what number of the recording sheet each page is printed when the images of the print data are formed on the recording sheets, and
    wherein the stamp drawing information further includes data indicating at which position on which of the front surface or the rear surface of what number of the recording sheet the stamp is printed when the images of the print data are formed on the recording sheets, and
    a stamp drawing portion configured to draw the predetermined stamp spanning different recording sheets at the drawing position in the different recording sheets indicated by the stamp drawing information calculated by the stamp drawing information calculating portion in a booklet printing.

2. The image forming apparatus according to claim 1, wherein
    the stamp drawing information calculating portion changes the drawing position at which the predetermined stamp is to be drawn, in correspondence with the drawing position indicated by the pane information.

3. An image forming method applied to an image forming apparatus capable of forming an image of a predetermined stamp when an image of obtained print data is formed on a recording sheet, the image forming method comprising:
    calculating pane information including recording sheet number information and drawing position information that indicate a recording sheet number of a recording sheet and a drawing position in the recording sheet at which an image of each page of the print data is to be formed;
    calculating stamp drawing information including recording sheet number information and drawing position information that indicate a recording sheet number of a recording sheet and a drawing position in the recording sheet at which a predetermined stamp is to be drawn in correspondence with the calculated pane information;
    wherein the pane information further includes data indicating at which position on which of a front surface or a rear surface of what number of the recording sheet each page is printed when the images of the print data are formed on the recording sheets, and
    wherein the stamp drawing information further includes data indicating at which position on which of the front surface or the rear surface of what number of the recording sheet the stamp is printed when the images of the print data are formed on the recording sheets, and
    drawing the predetermined stamp spanning different recording sheets at the drawing position in the different recording sheets indicated by the calculated stamp drawing information in a booklet printing.

* * * * *